Aug. 26, 1947.  W. H. SILVER  2,426,529
REVERSIBLE MOUNTABLE GAUGE WHEEL UNIT
Original Filed Sept. 12, 1940  2 Sheets-Sheet 1
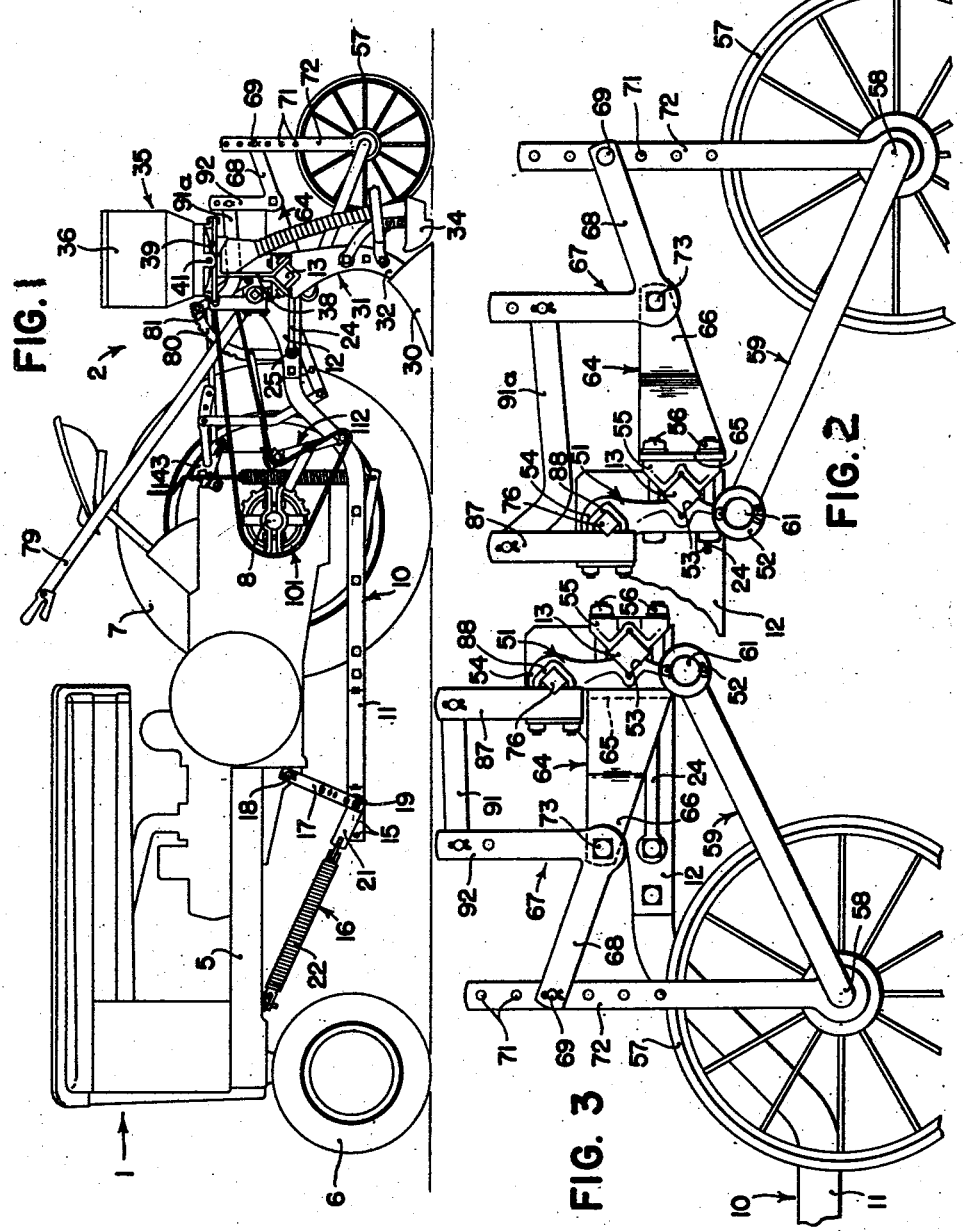
INVENTOR.
WALTER H. SILVER
BY
ATTORNEYS.

Aug. 26, 1947. W. H. SILVER 2,426,529
REVERSIBLE MOUNTABLE GAUGE WHEEL UNIT
Original Filed Sept. 12, 1940 2 Sheets—Sheet 2

INVENTOR.
WALTER H. SILVER
BY
ATTORNEYS.

Patented Aug. 26, 1947

2,426,529

UNITED STATES PATENT OFFICE 2,426,529

REVERSIBLE MOUNTABLE GAUGE WHEEL UNIT

Walter H. Silver, Moline, Ill., assignor to Deere & Company, Moline, Ill., a corporation of Illinois Original application September 12, 1940, Serial No. 356,433. Divided and this application June 2, 1943, Serial No. 489,583

11 Claims. (Cl. 97—189)

This application is a division of my co-pending United States application, Serial No. 356,433, filed September 12, 1940, issued June 13, 1944 as United States Patent No. 2,351,078.

This invention relates generally to agricultural implements and more particularly to listers and bedders of the type adapted to receive a plurality of tools of different kinds and arranged in different ways to accommodate various conditions of operation.

Generally speaking, a lister or bedder of the tractor-mounted or integral type, with which the present invention is more particularly concerned, comprises a frame connected at its forward end with the tractor for generally vertical swinging movement and having a rear transverse tool bar to which the desired tools at the desired spacing are connected, together with gauge wheel means for gauging the depth of operation of the tool or tools. Usually, such implements may be arranged to serve as a two-row, three-row, or four-row machine and may receive tools for forming trenches or furrows, or for either splitting or sweeping off the tops of previously formed beds or ridges, either previous to or simultaneously with planting operations, as desired.

The object and general nature of this invention is the provision of new and improved means for connecting and operating the gauge wheels so that at a minimum expenditure of time and energy the implement may be arranged to do the work desired under the conditions to be encountered. More specifically, it is a feature of this invention to provide longitudinally adjustable gauge wheels. It is desirable to have the gauge wheels operate as close as possible to the tools whose operation they gauge, and in some conditions this requires that the gauge wheels be disposed forward of the tools, but in other conditions the gauge wheels preferably are disposed rearwardly of the tools. For example, when lister bottoms or furrow openers of the moldboard type are employed, it is desirable to have the gauge wheels in their forward position and arranged so as not to run on the freshly turned soil. On the other hand, when sweeping off the top soil of the beds, or in similar operations, it would not be desirable to have the gauge wheels run on the loose top of the beds, and therefore it is generally preferable to have the gauge wheels disposed rearwardly and spaced to run in the rear wheel tracks.

A further and specific feature of this invention is the provision of operating connections associated with the gauge wheels by which the height of the implement frame relative to the ground may be controlled, said means including a hand-controlled bell crank mounted on a part of the implement frame that extends forwardly so as to dispose the bell crank substantially directly above the portion of the gauge wheel crank axle with which it is connected, and further it is an additional feature of this invention to provide said bell crank mounting so that it may be arranged to accommodate the aforesaid optional disposition of the gauge wheels, namely fore or aft with respect to the transverse tool-carrying bar.

Thus, by virtue of the features of the present invention, a lister and bedder is provided which may be quickly, easily, and efficiently adaptable to many tillage jobs and further, with the addition of planting units, may be readily changed from a tillage implement to a planting implement.

These and other objects and advantages of the present invention will be apparent to those skilled in the art after a consideration of the following detailed description, taken in conjunction with the accompanying drawings illustrating the preferred form of the invention.

In the drawings:

Figure 1 is a side view of an implement incorporating the principles of the present invention and arranged as a four-row planter employing tools in the form of sweeps with gauge wheels arranged in a rear position and spaced to run in the rear wheel tracks;

Figure 2 is a detail view of the gauge wheels and associated parts with the gauge wheels in their rear position as shown in Figure 1;

Figure 3 is a view similar to Figure 2, showing the gauge wheels in their forward position;

Figure 4:
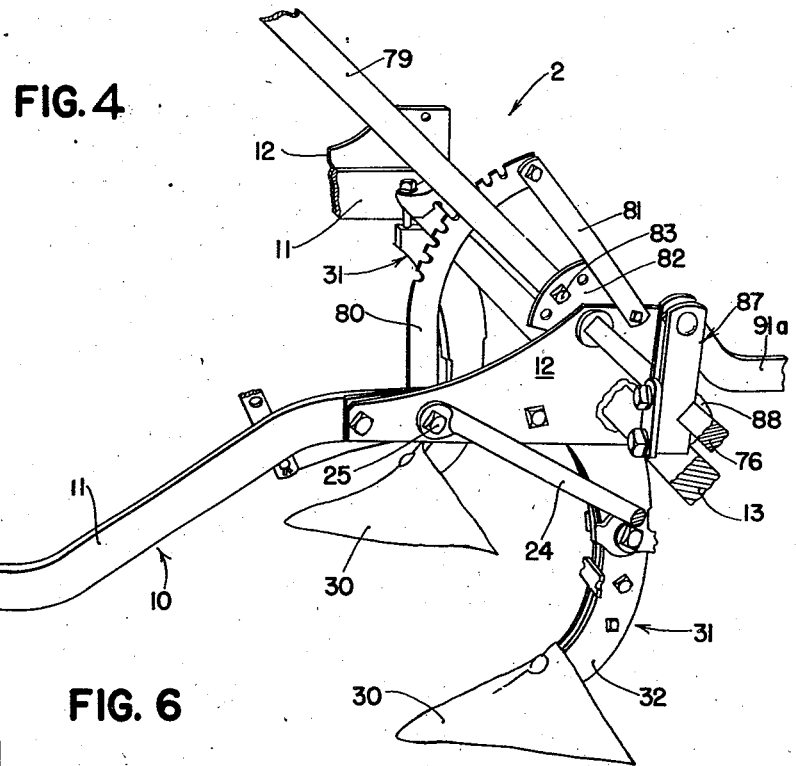
Figure 4 is a fragmentary perspective view, showing a portion of the gauge wheel adjusting means.

Referring now to the drawings, the reference numeral 1 indicates the tractor and the reference numeral 2 indicates the implement. The tractor 1 is of more or less conventional construction, comprising means serving as a frame, indicated at 5, supported on front steering wheels 6 and rear traction wheels 7. The latter are mounted on axle shafts 8 for lateral adjustment so as to vary the tread of the tractor. The rear axle housing of the tractor includes lateral extensions in which the axle shafts 8 are journaled for rotation.

The implement 2 comprises frame 10 which includes a pair of generally longitudinally extending beams 11 which at their rear ends are bolted or otherwise secured to plates 12 which are welded in laterally spaced relation to a rear transverse tool bar 13, the latter preferably extending laterally outwardly beyond and in rear of the rear tractor wheels 7. The beams 11 converge forwardly and at the forward ends are connected together and have a plurality of apertures, as indicated at 15. The implement frame 10 is connected with the forward portion of the tractor by a hitch 16 that comprises a yoke 17 pivoted, as at 18, to the tractor and at its lower end carries a pivot bolt 19 which is disposed in one of the several frame openings 15. A pair of links 21 are also connected at the rear ends to the pivot bolts 19 and at the forward ends are connected to one or more cushioning springs 22. The latter are connected at the forward ends to the front end of the tractor, as shown on Figure 1. The cushioning springs 22 not only cushion the load but also serve as a safety device to prevent the tractor and the implement from breakage when field obstructions are encountered, the entire implement frame shifting generally rearwardly when the springs 22 yield.

The connection between the frame plates 12 and the tool bar 13 is reenforced by a pair of braces 24, the laterally inner ends of the braces being secured, by a bolt 25, to the forward part of the associated plate 12 while the laterally outer ends of the braces 24 are connected with the transverse tool bar 13, preferably by welding or the like.

Figures 1 and 2 show the implement arranged as a four-row sweep planter, in which case the two sweeps at each side of the machine are disposed substantially equal distances on opposite sides of the tractor wheels, and the implement frame can therefore be disposed in a forward position, such as by inserting the pivot bolt 19 in the rear hole 15 at the forward ends of the tool beams 11. This disposes the implement frame 10 in a forward position but with adequate clearance between the rear tractor wheels 7 and the frame. Also, since sweeps are being used, the gauge wheels may be arranged to occupy a rear position, running in the bottoms of the furrows behind the rear wheels and between the beds worked by the sweeps.

Referring now more particularly to Figures 2 and 3, the tool beam 13 is preferably square in cross section and uniform in cross section so that the parts adapted to be attached thereto may be disposed in any one of a plurality of lateral positions. When four tools are provided to afford four-row operation, the laterally outer tools are fixed adjacent the outer ends of the tool bar while the two inner tools are fixed to the tool bar just inside the attaching plates 12. The sweeps are each indicated by the reference numeral 30 and are fixed, respectively, to the lower ends of beams or standards 31, each of the latter including foot pieces 32 adapted to receive different sizes and types of ground working tools. As mentioned above, sweeps, such as are shown at 30 in Figure 1, are commonly employed for sweeping off the tops of previously formed beds to accommodate a subsequent planting operation, and if desired planting may be done at the same time sweeps are used for sweeping off the tops of the beds or ridges. To this end furrow openers 34 and seeding units 35 may be supported on the tool bar 13. The seeding units 35 are more or less of conventional construction and hence extended description will be unnecessary. Briefly, each unit includes a seed container 36 having in the lower portion thereof conventional seed selecting and feeding mechanism, the whole being supported upon a standard 38 on which a plate or base 39 is fixed. The seeding mechanism is driven by a transverse seeding shaft 41, there being one shaft 41 at each side of a four-row implement, with each shaft driving two units and in turn being driven from the axle shaft at that side of the tractor.

It will be observed that the implement frame 10 as a whole is supported for floating movement relative to the tractor and is connected with the latter at a pivot point 19 accommodating the vertical swinging movement of the implement relative to the tractor. It is usual for implements of this kind to provide ground-engaging gauge means for insuring that the tools will always run at the proper depth, and in view of the fact that according to the present invention various sizes and types of equipment may be utilized, the present invention contemplates a new and improved form of gauging means and control means therefor whereby the gauge wheels or other ground-engaging elements may be disposed in any one of several different positions so as to make it possible conveniently and easily to arrange the gauge wheels to accommodate the particular tools employed.

Referring now more particularly to Figures 2 and 3, a bracket casting 51 is disposed adjacent each laterally outer end of the tool bar 13 and is provided at its lower end with a transverse sleeve section 52, an intermediate bar receiving notch 53, and an upper bearing section 54. For clamping the bracket casting 51 in place, I provide a cap 55 and a pair of clamping bolts 56 which, when tightened, secure the casting 51 firmly and rigidly to the tool bar 13. Each gauge wheel is indicated by the reference numeral 57 and is mounted on the laterally bent end 58 of a gauge wheel crank axle 59. The upper end 61 of the latter is bent in the opposite direction and is journaled for rocking movement in the sleeve section 52 of the bracket 51 associated therewith. Any suitable means, such as cotter keys or the like, may be provided for retaining the gauge wheel crank axle 59 against lateral displacement relative to the associated supporting bracket member. Likewise, any suitable means may be provided for holding the wheel 57 in proper position on the wheel receiving section 58 of the crank axle. The sleeve section 52 of the bracket 51 is not exactly parallel with the tool bar 13 when the bracket casting is clamped in place; instead, the sleeve section 52 has a slight angular displacement so as to provide the proper tilt or camber for the associated gauge wheel 57. It will be noted that the sleeve section 52 is disposed well below the bar 13 so that the gauge wheel crank axle 59 may occupy either a forwardly extending position or a rearwardly extending position, as desired, with ample clearance between the crank axle and the bar 13.

A bell crank supporting bracket, indicated in its entirety by the reference numeral 64, is provided with a laterally extending attaching section 65 which is apertured to receive the clamping bolts 56, whereby the bracket 64 may be clamped to the tool bar 13 along with the gauge wheel crank axle supporting casting 51. The bracket 64 is bent laterally and forwardly and terminates in a bell crank receiving section 66 which is apertured to pivotally support the bell crank 67. One arm 68 of the latter extends generally in a fore and aft direction and carries a pin 69 which is adapted to be disposed in any one of a plurality of apertures 71 formed in the upper end of a generally vertically extending link 72. The lower end of the latter is provided with an enlarged opening so as to receive the gauge wheel supporting section 58 of the crank axle 59. The bell crank is pivoted at 73.

As best illustrated in Figures 2 and 3, and as mentioned above, the gauge wheel crank axles 59 may be arranged to extend either generally forwardly or generally rearwardly, as desired, optionally disposing the associated gauge wheel 57 either in front of or in rear of the tool bar 13. Since the gauge wheels 57 determine the operating depth of the tools, suitable adjusting means, which will be described below, is associated with the bell cranks 67 and arranged to raise or lower the gauge wheel crank axles 59 relative to the implement frame 10. Therefore, it is necessary to arrange the bell crank supporting bracket 64 in a rearward position when the gauge wheel is disposed in its rearward position, and to arrange the bell crank supporting bracket 64 in a forward position when the gauge wheel crank axle 59 extends forwardly. This is conveniently accomplished since each of the brackets 64 are apertured to fit on the clamping bolts 56. Therefore, the brackets 64 may be clamped either to the main body of the gauge wheel supporting casting 51 or to the cap 55. In Figures 1 and 2 the gauge wheels are shown as disposed in their rearward position, and hence to accommodate this arrangement the brackets 64 are shown as clamped to the caps 55, while in Figure 3 the gauge wheels are shown as in their forward position, in which case the brackets 64 are shown as bolted to the gauge wheel crank axle supporting castings 51. The castings 51 always remain on the forward side of the tool bar 13, and the brackets 64 are bent laterally so as to dispose the end 66 thereof substantially above the gauge wheel receiving section 58 of the crank axle, thereby providing for the disposition of the bell crank 67 substantially directly above the wheel receiving part of the crank axle. Each of the brackets 64 is formed so that the end 66 is disposed above the horizontal center line of the attaching section 65, and therefore when changing the position of the gauge wheels from one side of the tool bar to the other, it is necessary to interchange the right and left hand brackets 64 for moving them from one side to the other of the tool bar 13 in order to have the end 66 of each bracket disposed in the proper positions, both fore and aft of the tool bar, while yet maintaining the outer end 66 of each bracket 64 substantially directly above the outer end of the associated crank axle.

Suitable depth-adjusting means is provided on the implement frame 10 for raising or lowering the gauge wheels to thereby adjust the depth of operation of the tools connected with the tool bar 13 of the frame 10, and according to the present invention such depth-adjusting and controlling means are particularly designed to accommodate the optional disposition of the gauge wheels and bell crank supporting brackets. At each side of the machine a rockshaft 76 is supported by any suitable means in the bearing section 54 of the crank axle supporting casting 51 at that side of the implement frame. Preferably the rockshaft 76 is supported for sliding movement relative to the bearing section 54, whereby the casting 51 may be shifted laterally along the tool bar 13 and along the rockshaft 76. The laterally inner end of the latter is suported for rocking movement by any suitable means in the upper portion of the associated frame plate 12, said means generally being arranged to limit or prevent actual movement of the rockshaft 76 relative to the frame plates 12.

For rocking the rockshaft 76 I provide a hand lever 79 movable relative to a sector 80 which, at one end, is fastened to the associated frame bar 11 by the bolt 25 that fastens the frame base 24. The other end of the sector 80 is connected by a strap 81 to the plate 12. The hand lever 79 preferably is fixed to a segmental plate 82 in any one of several positions, the plate 82 being welded or otherwise non-rotatably connected with the rockshaft 76 and the hand lever being bolted, as at 83, to the plate 82 in any one of a plurality of positions relative thereto. The hand lever 79 carries conventional detent mechanism which cooperates with the sector 80 to lock the lever 79 thereto. An arm 87 is clamped by a U-bolt 88 or the like to the rockshaft 76 generally in the vertical longitudinal plane that extends through the outer end 66 of the associated bell crank supporting bracket 64. A link 91, which is relatively short is pivoted to the outer end of the arm 87 and at the other end is pivoted to the other arm 92 of the associated bell crank 67. By virtue of this construction, when the hand lever 79 is released from its sector 80, swinging movement of the hand lever 79 rocks the arm 87 and acts through the link 91 to swing the bell crank 67, thus raising or lowering the gauge wheel associated therewith.

Due to the fact that the sleeve section 52 of the crank axle supporting casting 51 is not disposed directly underneath the tool bar 13, but slightly forwardly thereof, the same link 91 cannot be used in both positions of the gauge wheels and brackets 64. When the brackets 64 and gauge wheels 57 are disposed in their forward position as shown in Figure 3, the relatively short links 91 may be used, but when the brackets 64 and the gauge wheels 57 are in their rearward position, as shown in Figure 2, somewhat longer links 91a are used in place of the relatively short links 91. It will be seen, particularly from Figure 1, that the relatively longer links 91a are bent or curved so that they may pass underneath the associated seeding shaft 41. With the exception of the links 91, 91a the same parts of the gauge wheel and adjusting mechanisms are used, irrespective of whether the gauge wheels are disposed fore or aft of the tool bar 13.

Figure 5:
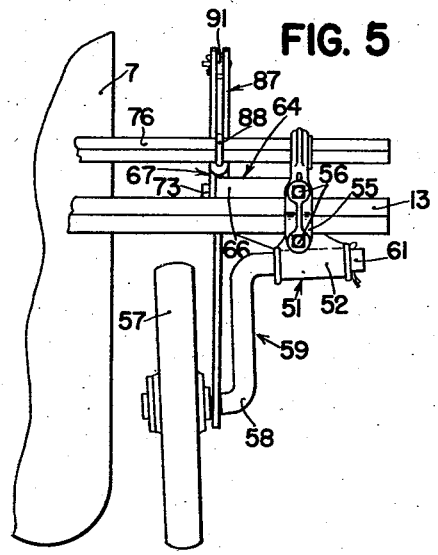
Figure 5 is a fragmentary rear view, looking forwardly, of the gauge wheel supporting means, with the gauge wheel disposed in a forward position and in its narrow setting, i. e., relatively close to the adjacent tractor wheel.

Figures 2, 3 and 5 show the gauge wheels 57 in what is termed their narrow setting; that is, the gauge wheel crank axles 59 are mounted in the associated sleeve sections 52 so that the wheel receiving section 58 extends generally laterally inwardly and disposes the associated gauge wheel 57 in a laterally inward position relative to the associated casting 51. It may be desired to arrange the gauge wheels in their wide setting so as to secure a lateral spacing between the gauge wheels greater than may conveniently be secured when the gauge wheels are connected with the associated supporting castings as shown in Figures 1–4.

Figure 6:
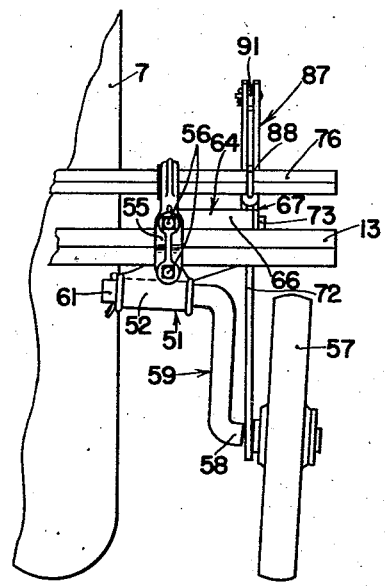
Figure 6 is a view similar to Figure 5 but shows the manner of attaching the gauge wheels to secure a wide spacing.

Referring now to Figure 6, it will be seen that to place the gauge wheels in their wide setting, all that it is necessary to do is to interchange the right and left hand castings 51 so that the normally right hand casting, when the gauge wheels are in their narrow setting, is disposed at the left end of the tool bar 13, and the normally left hand casting 51, when the gauge wheels are in their narrow setting, is at the right hand end of the tool bar 13. The castings 51 are always bolted at the front of the tool bar 13. By virtue of this arrangement, the correct pitch in the wheels is maintained with any wheel setting, thereby reducing end pressure and avoiding wear on the gauge wheel boxes. When gauge wheels are to be used in the wide setting, the gauge wheel crank axles are inserted through the bearing sleeve section 52 from the outer side, rather than from the inner side as when the wheels are used in their narrow setting. In both Figures 5 and 6, the gauge wheel illustrated is shown in a forward position, but it is to be understood that the wheel could be swung rearwardly into its rearward position, merely by changing the bell crank brackets 64 as described above.

The operation of the implement described above is substantially as follows:

When employed as a four-row machine, the tools, whether sweeps or lister bottoms, will be spaced on opposite sides of the vertical longitudinal planes of the tractor rear wheels. Therefore, the frame 10 may be disposed in a forward position, as shown in Figure 1, disposing the pivot pin 19 in the rear hole 15. If sweeps are used, as shown in Figure 1, it is preferable to have the gauge wheels disposed rearwardly, since it is not desired to have the wheels run on the tops of the loose beds. By disposing the gauge wheels rearwardly, the gauge wheel axle castings 51 are spaced along the tool bar 13 so as to place the gauge wheels 57 substantially directly behind the rear tractor wheels 7 so they run in the wheel tracks and in the bottoms of the previously formed furrows. If, however, lister bottoms of the moldboard type are employed to form a four-row machine, the frame 10 may be disposed in its forward position, but the gauge wheels would preferably be disposed, not in a rearward position as shown in Figures 1 and 2, but in a forward position (Figure 3), preferably immediately in front of the laterally outermost lister bottoms.

The machine may be arranged as a three-row implement by disposing the tools, which may be lister bottoms as mentioned above, so that one tool is disposed centrally and the outer tools are arranged one behind each of the tractor rear wheels. In this case, where there is a tool immediately behind each rear tractor wheel, it is preferable to have the frame 10 disposed in its rearward position so that there is ample clearance between the tools and the rear wheels. Under these conditions the gauge wheels preferably are disposed in their forward position and in their narrow setting, so as to place the gauge wheels as close as possible to the lister bottoms. It is also possible with the present implement to conveniently employ two bottoms, in which case the rear tractor wheels are placed in their laterally inward positions, and the gauge wheels are disposed in their forward position with a narrow setting and spaced along the tool bar 13 as closely as possible to the rear tractor wheels. This is done so that on the return trip neither the tractor wheel nor the gauge wheel at the forward side of the outfit will run on the loose ground thrown up by the landward lister bottom on the previous round. The feature of the present invention in which the frame may be hitched to the tractor in any one of several longitudinally positions is useful, not only to accommodate different kinds and spacings for tools but also enables any one particular implement to be attached to different sizes of tractors.

While I have shown and described above a preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, means serving as a frame, a gauge wheel axle swingably connected with said frame for disposition in either a fore or an aft position, a bracket having a generally longitudinally extending section, means for securing said bracket to said frame means in two optional positions, one with said section extending forwardly and the other with said section extending rearwardly, corresponding to the disposition of said swingable gauge wheel axle, and means carried at the outer end of said section and operatively connected with the outer end of said gauge wheel axle for raising and lowering said gauge wheel.

2. In an implement having frame means including a transverse tool bar, a gauge wheel construction comprising a bracket adapted to be disposed on one side of said bar and having a crank axle receiving section, a gauge wheel crank axle mounted for rocking movement in said section in one of two optional positions, namely, either in a fore or an aft position with reference to said tool bar, means including a cap at the side of said bar opposite said bracket for securing the latter to said bar, a depth adjusting crank bracket adapted to be optionally fixed to said bracket when said gauge wheel crank axle is in one position, or to said cap when said gauge wheel crank axle is in its other position, a depth adjusting bell crank pivoted to the outer end of said bracket, and a link connecting one arm of said bell crank to the outer end of said crank axle.

3. In an agricultural implement having a transversely disposed tool bar, a pair of gauge wheel brackets, one disposed adjacent each end of said tool bar, each of said brackets comprising a lower crank axle receiving sleeve and an upper bearing section disposed generally to one side of the vertical plane of said tool bar, a gauge wheel crank axle swingably supported in each of said sleeves and including a generally longitudinally extending gauge wheel receiving section, a gauge wheel on each of said last mentioned sections, said crank axle being swingable in the sleeve associated therewith in either of two optional positions, namely, either in a fore or an aft position with reference to said tool bar, a cap for each of said brackets, each of said caps being disposed on the side of said tool bar opposite the bracket, attaching means for clamping each cap and bracket rigidly to the tool bar, a pair of bell crank supporting arms, one for each of said brackets, said arms being right and left hand, respectively, and each including a laterally directed attaching flange and an outwardly and upwardly extending section, a bell crank mounted for rocking movement on each of said last mentioned sections, connecting means between one arm of each of said bell cranks and the associated crank axle, a member rockably mounted in the bearing section of each bracket, means for rocking said member, and a connection between said member and the associated bell crank, the attaching flange of each bell crank supporting arm being formed to receive the attaching means which clamp the caps and brackets to said tool bar, whereby said arms may be clamped against said brackets and extend forwardly with respect to said bar or to said cap and extend generally rearwardly therefrom, thereby disposing the bell crank generally directly above the gauge wheel crank axle in either position of the latter, said connecting means comprising a relatively short link when said crank axle and said arm are disposed in their forward position and said connecting means comprising a longer link when said crank axle and bell crank supporting arm are in their rearward positions.

4. In an agricultural implement having a transversely disposed tool bar, a pair of gauge wheel brackets, one disposed adjacent each end of said tool bar, each of said brackets comprising a lower crank axle receiving sleeve and an upper bearing section, a gauge wheel crank axle swingably supported in each of said sleeves and including a generally longitudinally extending gauge wheel receiving section, a gauge wheel on each of said last mentioned sections, said crank axle being swingable in the sleeve associated therewith in either of two optional positions, namely, either in a fore or an aft position with reference to said tool bar, a cap for each of said brackets, attaching means for clamping each cap and bracket rigidly to the tool bar, a pair of bell crank supporting arms, one for each of said brackets, a bell crank mounted for rocking movement on the outer end of each of said arms, connecting means between one arm of each of said bell cranks and the associated crank axle, a member rockably mounted in the bearing section of each bracket, means for rocking said member, and a connection between said member and the associated bell crank.

5. In a tractor mounted implement, an implement frame including a transverse tool bar, a gauge wheel bracket connected with said tool bar, a gauge wheel crank axle connected with said bracket and optionally disposable either forwardly or rearwardly of said tool bar, and means mounted on said wheel bracket and reversible relative to said transverse tool bar therewith for moving said gauge wheel crank axle generally vertically in either its forward or its rearward position relative to said tool bar.

6. In an implement having frame means including a transverse tool bar, a gauge wheel construction comprising a gauge wheel crank axle mounted for rocking movement on said bar in either of two optional positions, namely, either in a fore or an aft position with reference to said bar, a depth adjusting crank bracket adapted to be optionally fixed to said tool bar generally at one side thereof when said gauge wheel crank axle is in one position, or to the bar generally at the other side thereof when said gauge wheel crank axle is in its other position, and means mounted on the outer end of said bracket and connected with said crank axle for rocking the latter.

7. In an implement having frame means including a transverse tool bar, a gauge wheel construction comprising a bracket adapted to be fixed to said bar and having a crank axle receiving section, a gauge wheel crank axle mounted for rocking movement in said section in either of two optional positions, namely, either in a fore or an aft position with reference to said tool bar, a depth adjusting crank bracket adapted to be optionally fixed to said tool bar generally at one side thereof when said gauge wheel crank axle is in one position, or to the tool bar generally at the other side thereof when said gauge wheel crank axle is in its other position, and means mounted on the outer end of said second bracket, in either position of the latter relative to said bar, and connected with said crank axle for rocking the latter.

8. In an implement having frame means including a transverse tool bar, a gauge wheel construction comprising a bracket adapted to be fixed to said bar and having a crank axle receiving section, a gauge wheel crank axle mounted for rocking movement in said section in either of two optional positions, namely, either in a fore or an aft position with reference to said bar, a depth adjusting crank bracket adapted to be optionally fixed to one side of said first bracket when said gauge wheel crank axle is in one position, or to the other side of said first bracket when said gauge wheel crank axle is in its other position, and means mounted on the outer end of said second bracket and connected with said crank axle for rocking the latter.

9. In an agricultural implement, frame means including a transverse bar, a gauge wheel axle swingably connected with said transverse bar for disposition either in front of or rearwardly of said transverse bar, and means mounted on said transverse bar and also disposable either in a fore or an aft position relative to said transverse bar for raising and lowering said gauge wheel axle.

10. The invention set forth in claim 8, further characterized by said gauge wheel crank axle having a wheel-receiving section and a sleeve-receiving section, and said gauge wheel bracket having a sleeve section disposed at an angle to said tool bar, said sleeve section receiving the last mentioned section of said crank axle, the angularity of said sleeve section positioning said crank axle so as to provide the desired tilt for said gauge wheel.

11. In a tractor mounted implement, an implement frame including a transverse tool bar, a gauge wheel bracket connected with said tool bar, a gauge wheel crank axle connected with said bracket and optionally disposable either forwardly or rearwardly of said tool bar, said gauge wheel crank axle including a generally Z-shaped bar having laterally spaced wheel-receiving and bracket-receiving sections arranged in substantially parallel relation, said gauge wheel bracket including a sleeve portion disposed at an angle to the main body of the bracket and adapted to receive the sleeve section of said crank axle, said gauge wheel bracket being mounted in optional positions on said tool bar and said sleeve-receiving portion of the crank axle being insertable into said sleeve section from either end thereof, accommodating the disposition of the crank axle with the gauge wheel either laterally inwardly or laterally outwardly of said sleeve section, the angularity of the latter serving to provide the proper tilt for the gauge wheel in either position of said gauge wheel crank axle.

WALTER H. SILVER.

REFERENCES CITED

The following references are of record in the file of this patent:

UNITED STATES PATENTS

| Number | Name | Date |
|---|---|---|
| 2,171,031 | Graham et al. | Aug. 29, 1939 |
| 1,283,679 | Copeland | Nov. 5, 1918 |
| 2,300,446 | Fidler | Nov. 3, 1942 |
| 594,092 | Matteson | Nov. 23, 1897 |
| 632,389 | Wilbur | Sept. 5, 1899 |
| 866,226 | Russell | Sept. 17, 1907 |
| 1,946,403 | Johnson | Feb. 6, 1934 |

FOREIGN PATENTS

| Number | Country | Date |
|---|---|---|
| 656,537 | France | Jan. 2, 1929 |